United States Patent

Guyon et al.

[11] 3,995,940
[45] Dec. 7, 1976

[54] LUMINOUS DISPLAY DEVICE

[75] Inventors: Pierre Guyon, St-Ismier; Robert Meyer, St-Martin d'Heres, both of France

[73] Assignee: Commissariat a l'Energie Atomique, Paris, France

[22] Filed: Mar. 10, 1975

[21] Appl. No.: 557,151

[30] Foreign Application Priority Data

Mar. 12, 1974 France .............................. 74.08377

[52] U.S. Cl. .............................. 350/160 R; 350/150
[51] Int. Cl.² .......................................... G02F 1/01
[58] Field of Search ........... 350/150, 160 R, 160 P, 350/164, 165

[56] References Cited

UNITED STATES PATENTS

| | | | |
|---|---|---|---|
| 3,578,843 | 5/1971 | Castellion | 350/160 R |
| 3,844,636 | 10/1974 | Maricle et al. | 350/160 R |
| 3,854,794 | 12/1974 | Van Dam et al. | 350/160 R |

*Primary Examiner*—John K. Corbin
*Assistant Examiner*—Rolf Hille
*Attorney, Agent, or Firm*—Sughrue, Rothwell, Mion, Zinn and Macpeak

[57] ABSTRACT

The display device comprises a light source, a uniform layer $C_a$ of semi-reflecting material of small thickness and illuminated by the light source, a uniform layer $C_b$ of transparent material having a refractive index $n$ and a thickness $e$ deposited on the layer $C_a$, the optical thickness of the layer $C_b$ being constant and equal to $ne$ as measured at right angles to the surface, a reflecting layer $C_c$ deposited on at least part of the layer $C_b$ in order to form the patterns which are intended to be displayed.

21 Claims, 7 Drawing Figures

LUMINOUS DISPLAY DEVICE

BACKGROUND OF THE INVENTION

This invention relates to a luminous display device comprising means for modifying at will the reflectivity of at least a portion of a surface so as to vary the luminance and/or the color of that part of the surface whose reflectivity has been changed. The device permits the display of patterns corresponding to those parts of the surface in which the reflectivity undergoes variation and makes it possible in more general terms to modify the coefficient of reflection of a surface by creating or removing a reflecting layer which forms one face of an interferential filter and consists of a transparent film having a given optical thickness and tightly held between two partially reflecting faces.

Numeric and alphanumeric display devices can be placed in two categories: light-emitting devices (electroluminescent diode, gaseous discharge device, incandescence device) and the devices which call for auxiliary lighting such as liquid crystals, the electrochromic and electrolytic devices. The optically passive visual display devices which are invisible in darkness and fall in the category just mentioned consume much less energy and their visibility is enhanced by a high level of illumination, which can be an advantage in the case of observation in an environment of high luminous intensity. A further property of electrochromic and electrolytic devices lies in the fact that they consume energy only at the time of modification of the information which is displayed. Such devices essentially have an internal memory and their use is of interest in all applications in which the switching frequency is of low value and the available power is limited.

In conventional display devices which fall in the category of electrolytic devices, action if produced on the variation in reflectivity of a glass plate when a colored metallic or organometallic film-layer is deposited by electrolysis on the face remote from the viewing side. It is clearly possible to work both in reflection and in transmission. However, the contrast obtained with a metallic film-layer is sufficient only in the case of thicknesses of a few hundred Angstrom and therefore entails a large amount of electric power in order to deposit the metallic film-layer on the pattern design which is to be represented. Electrolytic display devices of the prior art do not employ the constructive interference phenomenon which is characteristic of interferential filters.

SUMMARY OF THE INVENTION

This invention is directed to a luminous display device whigh has ancillary lighting and exhibits high contrast for a metallic deposit of small thickness.

In more precise terms, the luminous display device in accordance with the invention essentially comprises:
— a light source S,
— a uniform layer $C_a$ of semi-reflecting material of small thickness and illuminated by the source S,
— a layer $C_b$ of transparent material having a refractive index $n$ and a thickness $e$ deposited on the layer $C_a$, the layer $C_b$ being such as to have an optical thickness which is constant and equal to $ne$ as measured at right angles to its flat surfaces,
— a reflecting layer $C_c$ deposited on at least part of the layer $C_b$ in order to form the patterns which are intended to be read by an observer who is preferably stationed on the other side of the layer $C_c$ with respect to the layer $C_b$.

In one embodiment of the invention, the layer $C_a$ is protected by a transparent plate L. The layer $C_a$ is then deposited on the layer L, the layer $C_b$ on the layer $C_a$ and the layer $C_c$ on the layer $C_b$.

The light source S is either an artificial source such as a lamp, neon lamp, laser or any source of natural light such as sunlight. The interferential filter is constituted by the three layers $C_a$, $C_b$ and $C_c$. The Fabry-Perot et al. on which constitutes the interferential filter has a spacing equal to $n\ e$, namely the thickness of the layer $C_b$ between two semi-reflecting layers $C_a$ and $C_c$. The formation or suppression of the layer $C_c$ modifies the reflecting properties of the filter to a considerable extent. The refractive index and the thickness of the layer $C_b$ are in fact chosen so as to ensure that the light emanating from a source S interferes constructively within the layer $C_b$, thereby producing a maximum degree of reflection by constructive interference in the direction of the observer in respect to a given wavelength. This wavelength is chosen in the portion of the spectrum which is transmitted by the first layer $C_a$, namely a metallic film, for example. The color which is accordingly observed when the layer $C_c$ exists is different from the color observed when the layer $C_c$ exists is different from the color observed when the layer $C_c$ is not present. This different color in conjunction with the presence of the layer $C_c$ or so-called interference color is distinctly different from that of the light reflected directly by the layer $C_a$. This interference phenomenon makes it possible to obtain a far better contrast than if the layer $C_a$ were not present and if the layer $C_b$ were of indeterminate and non-uniform thickness which would not given rise to an observable phenomenon of constructive interference. In the absence of the interference phenomenon, the variation in reflectivity of the device is solely due to the specular and incoherent reflection from the layer $C_c$ which, as has already been seen, imposes the need for a greater thickness of metal in the case of this last layer $C_c$ in order to ensure good legibility. Thus the presence of the layer $C_a$ and the metallic deposit $C_c$ on a layer of given optical thickness makes it possible to vary the reflectivity of the device as a whole to a considerable extent by creating an interferential filter in reflection as constituted by the three layers $C_a$, $C_b$ and $C_c$. This abrupt variation in reflectivity results in a variation in color and in intensity of the reflected light and can therefore be utilized for remote display or for any other system of variation of lighting or of color.

In one embodiment of the invention, the plate L has a frosted surface on the side nearest the observer. The frosted surface permits more agreeable viewing while retaining the contrast irrespective of the viewing angle. This facilitates observation in the case of lighting by means of a point source since the frosted surface diffuses the light reflected from the front face without affecting the colored light emanating from the interferential filter.

In an alternative embodiment of the invention, a non-reflecting film obtained by means of non-reflecting dielectric deposits in the conventional manner is deposited on the front face of the polished plate L.

The layer $C_b$ is of small thickness and therefore produces small variations in path differences between two rays introduced as a result of a greater or lesser degree of inclination of the light rays which impinge on the layer $C_a$ and are reflected from the layer $C_c$ after having passed through the layer $C_b$. In consequence, the angle of observation or viewing angle has little influence on the color of the patterns displayed. In order to reduce the thickness of the film-layer, thereby reducing the absorption to a corresponding extent and reducing the variation in color with the viewing angle, the first order is usually adopted.

In a preferential embodiment of the invention, the layer $C_a$ is made of a metal such as gold, platinum, palladium, rhodium and iridium or can alternatively be formed by a metallic boride, nitride or carbide. The thickness of the layer $C_a$ must in that case be distinctly smaller than the wavelengths of light in order to ensure that, assuming that the field of standard optics applies in the case under consideration, the optical wavelengths are capable of passing through said metallic layer in the form of evanescent waves.

In a further alternative embodiment of the invention, the layer $C_a$ is a dielectric and especially multidielectric semi-reflecting film.

When no layer $C_c$ is present, it is possible to observe the light derived from the source S, reflected by the layer $C_a$ and slightly modified by the presence of the layer $C_b$. When the layer $C_c$ is present, the interferential phenomenon arises and the light received by the observer is essentially the light obtained by interference.

In a preferential embodiment of the invention which is intended to control the appearance of the layer $C_c$, the device comprises:
— an electrolyte E in contact with the conductive layer $C_b$, said layer being such as to constitute a first electrode $E_a$ in conjunction with the layer $C_a$ when this latter is conductive,
— a second metallic electrode $E_b$ in contact with the electrolyte,
— a control voltage source for applying a potential difference between the electrodes $E_a$ and $E_b$ so as to ensure that the reflecting layer $C_c$ which is deposited on part of the layer $C_b$ is deposited when the electrode $E_a$ is negatively biased and redissolved under control action when the electrode $E_a$ is positively biased.

In this embodiment of the invention, the layer $C_c$ is deposited under control action and by electrolysis on at least part of the layer $C_b$ in order to constitute the second face of the interferential filter. In the electrolytic cell, one of the electrodes is transparent (layer $C_b$) and performs the function of interferential layer of the filter, the reflecting layer of the rear face being deposited or removed electrolytically and the semi-reflecting layer of the front face being permanent.

The layer $C_a$ must be semi-reflecting (semi-transparent) and have a minimum absorption capacity. As has already been mentioned, it is possible to employ simply a metallic film having a thickness within the range of 50 to 250 A in order to ensure that the transmission varies between 70 and 20%. The use of layers of refractory materials having a metallic character such as boride, nitride, carbide of metals selected from columns 4a, 5a and 6a of the Periodic Table of Elements results in the formation of layers having a degree of hardness and stability which offer advantages at the time of deposition of the transparent layer $C_b$. Furthermore, these refractory materials can be employed on thicknesses of several hundred Angstroms whereas the metallic layers having the same transmission must be distinctly thinner and are consequently more delicate.

As will become apparent from the examples which are given hereinafter, the material and the method of deposition adopted are such that the thin film is sufficiently adherent and resistant to subsequent deposition of the layer $C_b$.

The layer $C_b$ is selected so as to be nonabsorbent within the spectral region employed and sufficiently conductive to permit uniform electrolysis over its entire surface.

By way of example, there is employed a semiconducting oxide of indium doped by tin or a stannic oxide doped by antimony. The thickness of this layer will be chosen so as to exhibit an advantageous interferential maximum in reflection in the presence of the two layers $C_a$ and $C_c$. In the case of visual observation, the wavelength of said maximum is selected in the window of the visible spectrum so as to ensure that said maximum exhibits good contrast both in perceived intensity and in chromaticity with respect to the reflected spectrum in the absence of the layer $C_c$.

Moreover, an important point to be noted is the fact that the conductivity of the transparent layer $C_b$ is increased by the presence of the layer $C_a$ when it is either metallic or of metallic type, the two layers being placed in parallel in the electric circuit. This phenomenon permits the use of a layer $C_b$ formed of substances having lower conductivity. With a view to achieving the same result, it is also possible to deposit the layer $C_a$ on a conductive substrate, at least at the surface of this latter.

The materials which are suited to the formation of the layer $C_c$ are all metals and semi-reflecting compounds which do not react chemically with the layer $C_b$ and can be deposited and redissolved by electrolysis.

The presence of the layer $C_a$ and of a suitable layer $c_b$ which forms the interferential filter with the layer $C_c$ makes it possible to employ only a very thin layer $C_c$ (for example a metallic film having a thickness of less than 100 A). The layer $C_c$ is constituted by a metal M which can be deposited and redissolved from an electrolyte containing $M^{n+}$ ions of this metal in solution without affecting the properties of the transparent electrode (layer $C_b$).

The metals which can be employed for forming the layer $C_c$ are preferentially those in which the oxidation-reduction potential of the $M/M^{n+}$ pair is higher than:
— the reduction potential of the electrode $E_a$ which usually consists of an oxide in order to ensure that this latter cannot be reduced during deposition of the metal,
— the reduction potential of the $H^+$ ions if an aqueous electrolyte is employed so as to prevent parasitic evolution of hydrogen.

One example of metal which is particularly suitable for use as a layer $C_c$ is silver.

The electrode $E_b$ is constituted for example by a foil or thin film of the same metal as that which forms the layer $C_c$. The advantage of a system of this type lies in the fact that the electrochemical reactions which take place at the electrodes $E_a$ and $E_c$ are symmetrical:
— during deposition of the layer $C_c$, the reaction at the electrode $E_a$ is:

$$M^{n+} + ne \rightarrow M$$

and at the electrode $E_b$:

$$M \rightarrow M^{n+} + ne$$

— during dissolution of the layer $C_c$, the reaction at the electrode $E_a$ is:

and at the electrode $E_b$:

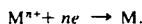

The equilibrium potential of the cell is zero; during operation, the potential difference between the electrodes $E_a$ and $E_b$ is solely due to overvoltages of the electrochemical reactions and to the resistance drop in the electrolyte and the conductors.

In the case of sufficiently small depths of electrolyte, the device can begin to operate with voltages of the order of 300 millivolts. The operating voltage of the cell is related solely to the current density, that is to say to the rate of deposition; the choice of electrolyte determines two versions of the device which employs:
- a liquid electrolyte, that is to say an aqueous or organic solution containing in either simple or complex form ions of the metal constituting the layer $C_c$. The other substances dissolved in the electrolyte are added with a view to ensuring that, under predetermined conditions of current density and voltage, a layer $C_c$ is obtained when the electrode $E_a$ is negatively biased and said layer $C_c$ is redissolved when the electrode $E_a$ is positively biased; it is possible for example to add a brightener in the liquid electrolyte in order to improve the deposit,
- a solid electrolyte: the use of solid electrolyte which exhibits very good conduction at room temperature by the $M^{n+}$ ion (and especially the $Ag^+$ ion) makes it possible to produce entirely solid electrochemical display devices.

These electrolytes are formed in thin films, for example by vacuum deposition techniques such as evaporation and sputtering, thus making it possible to reduce their internal resistance and to adopt a simple fabrication technology.

As has already been mentioned in the case of liquid electrolytes, should it be desired to obtain a long useful life of the solid device, the metals of the layer $C_c$ will preferably satisfy the inequality:

$$A < M/M^{n+}$$

where A is the oxidation-reduction potential of the substance constituting the electrode $E_a$ and $M/M^{n+}$ is the oxidation-reduction potential of the metal M. Copper, silver palladium and generally speaking all the precious metals satisfy this inequality.

Liquid electrolytes make it possible to deposit these metals in the form of a film by making use of commercially available solutions.

In the version of the device which calls for the use of a solid electrolyte, the electrolytes employed are all those which make it possible to obtain deposition and redissolution of a metal with a current density such that the rate of changeover is sufficient without affecting the properties of the transparent electrode. In the event that the layer $C_c$ is of silver, the solid electrolytes employed can be all those electrolytes in which the ionic conduction by the $Ag^+$ ion is sufficient at room temperature to obtain the desired current densities with a low voltage. By way of example, these materials are as follows:

- silver halides AgCl, AgBr, AgI considered separately or in a mixture,
- silver sulphur halides $Ag_3SI$ and $Ag_3SBr$,
- mixtures in suitable proportions of silver halide and alkali halide such as $RbAg_4I_5$ and $KAg_4I_5$,
- aluminum oxide doped by the $Ag^+$ ions having the formula $Ag_{1+x}Al_{11}O_{17}$ where $x$ is approximately equal to 0.16.

In accordance with an alternative embodiment of the invention, the device comprises an insulating layer deposited between the electrolyte and the layer $C_b$ so as to delimit the displayed zones, that is to say the zones in which a reflecting layer $C_c$ is deposited. The material which forms the deposited insulating layer is selected from the inorganic insulating materials such as silica, alumina and silicon nitride and the organic insulating materials such as resins, polymers and the like.

In another alternative embodiment of the invention, the electrode $E_b$ is cut so as to constitute the figures displayed by metallic deposition of the layer $C_c$ on those portions of the layer $C_b$ which are located opposite to the figure formed by the electrode $E_b$. In accordance with the invention, the current supplies to the electrode $E_b$ or the electrode $E_a$ serve to bring different parts of the electrodes $E_a$ or $E_b$ which are insulated from each other to different potentials.

BRIEF DESCRIPTION OF THE DRAWINGS

Further properties and advantages of the invention will become more readily apparent from the following description in connection with examples of construction which are given by way of explanation and not in any sense by way of limitation, reference being made to the accompanying drawings, in which.

DESCRIPTION OF THE PREFERRED EMBODIMENT

Figure 1:
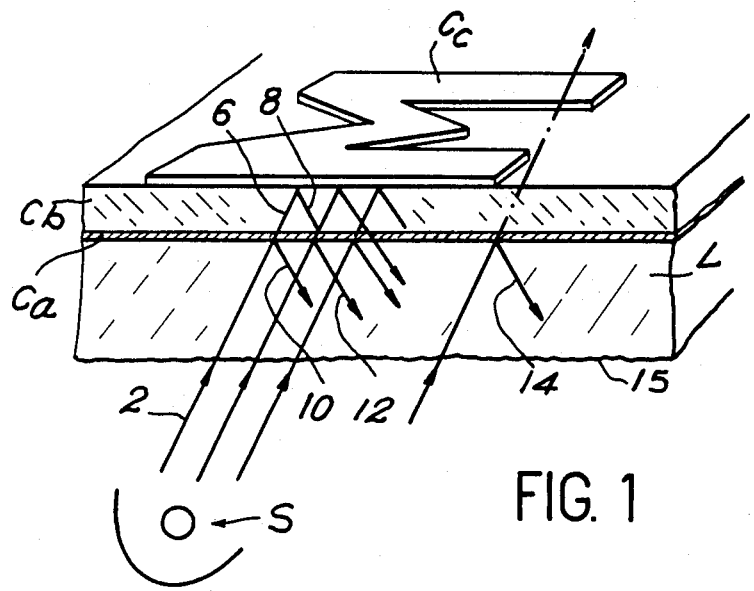
FIG. 1 is a diagram which illustrates the principle of the invention.

In the general diagram of FIG. 1, a source S directs rays such as the ray 2 onto a glass plate L having a frosted front face 15. In the presence of the reflecting layer $C_c$, the rays such as 2 are reflected several times along paths such as 6, 8, 10 and 12 in order to produce constructive interferences at the exit of the layer $C_a$. On the contrary, in the absence of any layer $C_c$, the only reflected ray derived from a ray such as 2 is the ray 14. In this example, the layer $C_c$ has the shape of an M. The face 15 of the glass plate L is ground or frosted.

Figure 2:
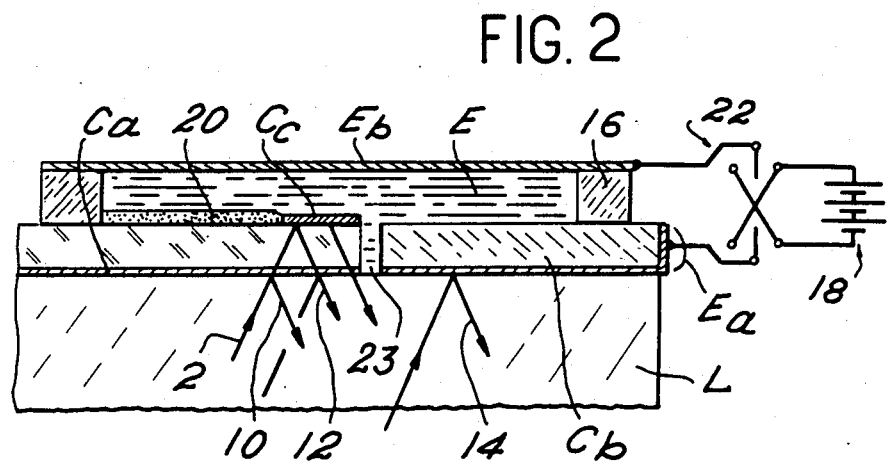
FIG. 2 is a constructional diagram of the device comprising a liquid electrolytic cell.

FIG. 2 shows one embodiment of the invention in which provision is made for a liquid electrolyte E contained in a compartment 16. A potential difference created by the dry cell 18 (or any other suitable voltage source) is applied between the electrode $E_a$ constituted by the layer $C_b$ and the metallic deposit $C_a$. An insulating layer is deposited on all those portions of the layer $C_b$ on which it is not desired to have a metallic deposit such as $C_c$. An insulating layer of this type is shown at 20. A voltage-reversing switch shown at 22 serves to vary the respective polarity of the electrodes $E_a$ and $E_b$. The electrode $E_b$ is of silver, for example. When the electrode $E_a$ is negatively biased, a film-layer $C_c$ of silver is formed on the layer $C_b$. The position of the layer $C_c$ is defined by etching of the conductive layers $C_b$ and also of the layer $C_a$ if necessary. Grooves such as the groove 23 thus appear within these layers. The width of said grooves must be reduced in order to ensure that these latter are as little visible as possible since they introduce permanent inhomogeneity in the layer.

Figure 3:
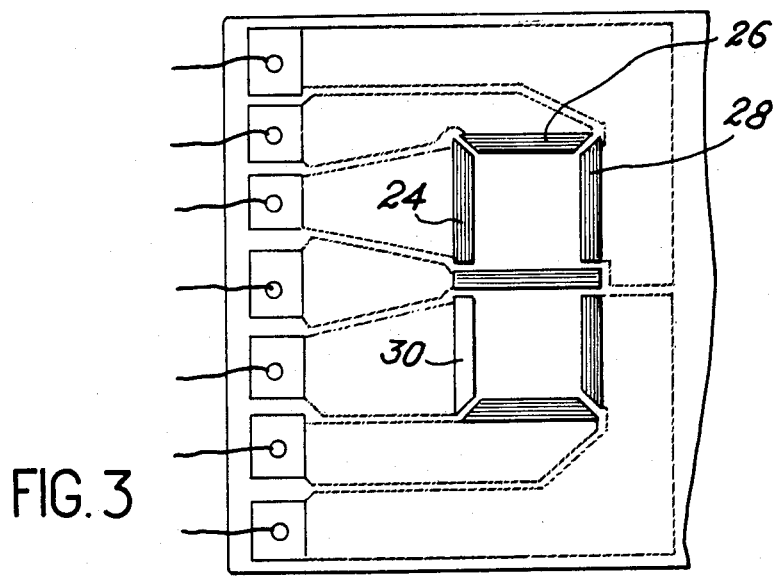
FIG. 3 is a diagram showing one type of current supply to the electrode $E_a$ for displaying arabic numerals.

There are shown in FIG. 3 current supply leads which are insulated with respect to each other and make it possible to constitute electrodes only in predetermined portions of the electrode $E_a$ as designated by the reference numerals 24, 26, 28 or 30. The combination of these different electrode elements associated with a system which is not shown in the figure will make it possible to deposit the electrolyte on the zones such as those mentioned above and thus to present any desired arabic numeral.

Figure 4:
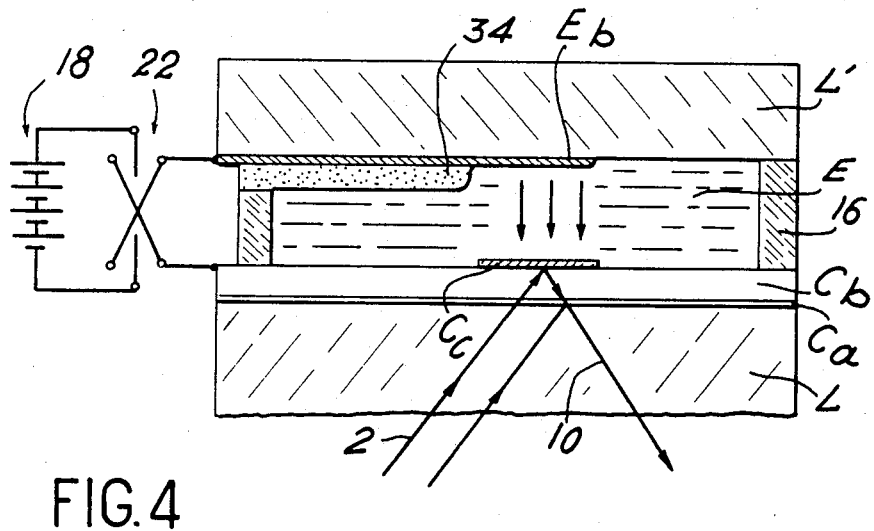
FIGS. 4 and 5 illustrate a liquid electrolytic cell and its current supply.

In FIG. 4, there is shown an embodiment of the invention in which provision is made for a liquid electrolyte E contained between two glass plates L and L' and an electrode $E_b$ which has been deposited on the rear plate L' and separated from the electrolyte E by an insulator 34. Deposition of the layer $C_c$ is carried out from the electrode $E_b$ on the portions of the layer $C_b$ located opposite to those portions of the electrode $E_b$ which are not covered with insulating material.

Figure 5:
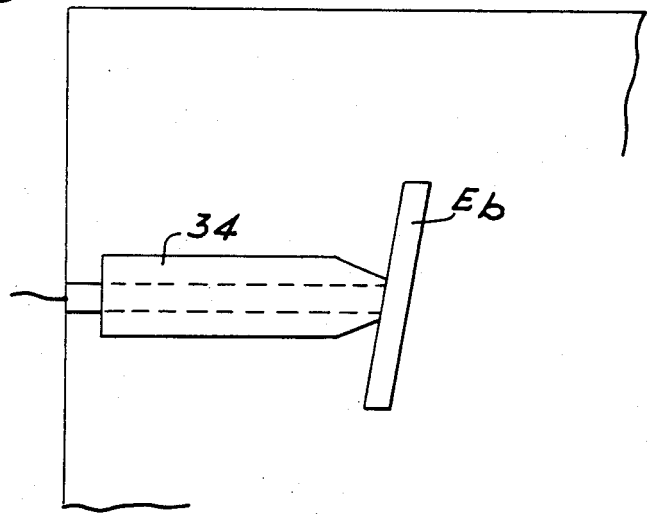

FIG. 5 shows the supply of current to the electrode $E_b$ looking from the interior, said electrode being partly covered by the insulator 34 on those portions of the electrode which it is not desired to dissolve in order to form a deposit $C_c$ on the layer $C_b$.

Figure 6:
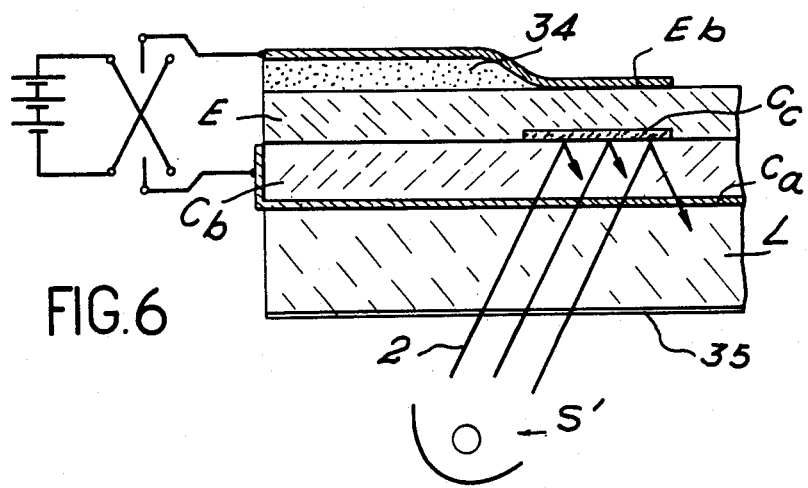
FIG. 6 shows one form of execution of the invention in which the electrode $E_b$ is active only on the patterns to be displayed.

In FIG. 6, there is shown an embodiment of the invention in which provision is made for a solid electrolyte E and an electrode $E_b$ separated from the electrolyte E by an insulator 34. Deposition of the layer $C_c$ is carried out from the electrode $E_b$ on those portions of the layer $C_b$ which are located opposite to the electrode $E_b$. The plate L is covered with a non-reflecting dielectric deposit 35.

Figure 7:
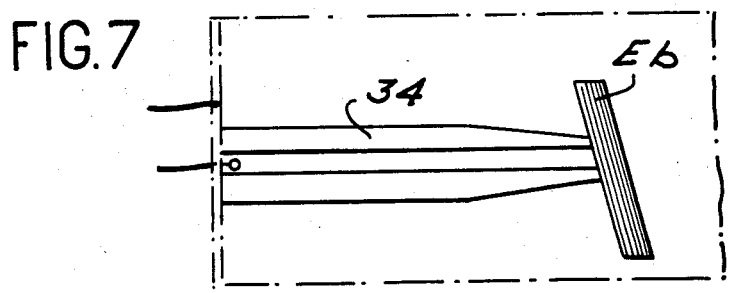
FIG. 7 shows a detail of the current supply to the electrode $E_b$ of the previous figure.

FIG. 7 shows the current supply to the electrode $E_b$ which is partly covered by the insulator 34 on those portions of the electrode which it is not desired to dissolve in order to form a deposit $C_c$ on the layer $C_b$.

In order to illustrate the present invention, there are described hereinafter four complete examples of a device in which two of these latter operate with a liquid electrolyte and two with a solid electrolyte.

EXAMPLE 1

In a liquid electrolyte device with etching on the front face, a gold film is deposited by evaporation or sputtering so as to form the layer $C_a$ on a frosted glass plate L.

The device is as shown in FIG. 2. The transmission of the gold film is 55% at about 5100 A in wavelength. A tin-doped indium oxide layer is then applied by reactive sputtering so as to form a layer $C_b$ having a thickness of 1100 A on the sub-layer of gold. Since the refractive index of indium oxide is approximately 2, the operation is performed in the first order of interference. After etching (either chemical or ionic) in order to define the displayed zones of the continuous background and to insulate them electrically from each other, an insulating deposit protects the current supply leads from any contact with the electrolyte. The insulating material is removed in those locations in which the display is to take place, either by selective chemical etching or by ionic etching or by any other known means. Either organic or inorganic insulating substances can be employed for this purpose. The front face as thus completed forms the front wall of an electrolytic cell having any desired thickness, the rear face of which is covered for example with a layer of silver so as to form the electrode $E_b$. The cell is filled with a liquid electrolyte from which it is possible to obtain a silver deposit. For example, the following bath can be employed:

Solvent: methyl alcohol
Salts: silver nitrate 10 g/l
Sodium thiocyanate 400 g/l

The applied voltage which depends on the depth of the electrolyte and on the conductivity of the electrode $E_a$ is such as to permit the passage of a current of 50 milliamperes per $cm^2$. This current which is applied for at least one-tenth of a second makes it possible to deposit 50 A of silver. This thickness appears to be the minimum thickness for obtaining sufficient contrast. The minimum quantity of electricity required is $5 \times 10^{-3}$ Coulomb per $cm^2$. There is obtained in this case a dark blue display zone contrasted with a pale golden-yellow background which corresponds to the reflection of the thin gold film.

EXAMPLE 2

Solid-electrolyte device with etching on the front face.

The front face having been prepared as stated in Example 1, the complete assembly is then covered with a layer of solid electrolyte, namely silver bromide, by vacuum evaporation. The silver bromide is in the microcrystalline form. The thickness must be sufficient (several microns) to prevent any short-circuit between the electrodes $E_a$ and $E_b$. The electrode $E_b$ is then evaporated, thus resulting in a silver film of sufficient thickness. Deposition of the 50 A in thickness of silver required for the display calls for the same quantity of electricity as in the first example.

EXAMPLE 3

Liquid-electrolyte device with etching on the rear face.

This device is shown in FIGS. 4 and 5. The front face is constituted solely by the unetched layers $C_a$ and $c_b$. The rear face has silver leads formed by evaporation for example and having a geometry so defined as to correspond to the geometry of the desired display. A layer of organic or inorganic insulating material is then added onto the leads covering the current supply zones which are not intended to be in contact with the electrolyte, the geometry of the insulating layer being obtained by any known means. The silver lead can evidently be associated with any other subjacent lead.

In this example, the electrolyte cell must be thin in order to ensure that the definition of the displayed patterns is not unduly affected by the diffusion of the silver ions in the liquid through which they pass. In accordance with the desired definition, a cell having a thickness of 10 to 20 $\mu$ will be employed.

EXAMPLE 4

Solid-electrolyte device with etching on the rear face.

This device which is shown in FIGS. 6 and 7 makes use of a solid electrolyte E. After deposition of the layers $C_a$ and $C_b$, the front face is covered with the layer of solid electrolyte such as silver bromide for example, as described in the second example. An organic or inorganic insulating layer is then added onto the solid electrolyte at 34. The nature of the insulating layer, the conditions of deposition and the methods of definition of the geometry are chosen so as not to degrade the solid electrolyte. Finally, a silver layer is added in accordance with a geometry corresponding to the pattern to be displayed as shown in FIG. 7.

It is readily apparent that the invention described in the foregoing is not limited to the display of numerals or letters but extends to all alternative applications of the device according to the invention which makes it possible by means of electrolytic deposition to produce variations in the reflectivity of a substance either locally or over the entire surface by utilizing the properties of the interferential filter.

Moreover, the invention includes the forms of construction in which the transparent supporting plate L is placed behind the superposed assembly of layers so that the layer $C_a$ appears outside said assembly. Finally, some structures can be observed from the rear, in which case the appearance of the display is reversed with respect to viewing from the front; it is only necessary to ensure that the electrolyte E, the electrodes $E_b$ and any insulating coatings are transparent; the electrolyte is usually transparent. In regard to the electrodes, it is possible to construct these latter in the form of transparent grids which are sufficient to permit electrolyses.

What we claim is:

1. A luminous display device comprising:
   — a light source S,
   — a uniform layer $C_a$ of semi-reflecting material
   — a uniform layer $C_b$ of transparent and conducting material having a refractive index $n$ and a thickness $e$ deposited on the layer $C_a$, the layer $C_b$ being such as to have an optical thickness which is constant and equal to $ne$ as measured at right angles to the surface,
   — a reflecting layer $C_c$ deposited on part of the layer $C_b$ in order to form the patterns which are intended to be read by an observer, the layers $C_a$, $C_b$ and $C_c$ constituting an interference filter,
   — an electrolyte E in contact with the conductive layer $C_b$, and a first electrode $E_a$ in contact with said layer $C_b$,
   — a second metallic electrode $E_b$ in contact with the electrolyte,
   — a control voltage source for applying a potential difference between the electrodes $E_a$ and $E_b$ so as to ensure that the reflecting layer $C_c$ which is deposited on at least part of the layer $C_b$ is deposited when the electrode $E_a$ is biased and redissolved under control action when the electrode $E_a$ is inversely biased.

2. A device according to claim 1, wherein said device comprises a plate L formed of transparent material on the face of which is in contact with the layer $C_a$ while the other face located in the side nearest the observer is frosted.

3. A device according to claim 1, wherein said device comprises transparent plate L such that one fact of said plate is in contact with the layer $C_a$ and the other face located on the side nearest the observer is covered with a deposit of non-reflecting films.

4. A device according to claim 1, wherein the layer $C_a$ is formed of a metal selected from the group consisting of gold, platinum, palladium, rhodium and iridium.

5. A device according to claim 1, wherein the layer $C_a$ is formed of a material selected from the group consisting of the metallic borides, nitrides and carbides.

6. A device according to claim 1, wherein the layer $C_a$ is a separating dielectric layer.

7. A device according to claim 1, wherein the layer $C_b$ is conductive and selected from the group consisting of the semiconducting oxides.

8. A device according to claim 1, wherein the conductive and transparent layer $C_b$ is selected from the group consisting of indium oxide doped by tin and stannic oxide doped by antimony.

9. A device according to claim 1, wherein the layer $C_b$ has low conductivity and wherein the layer $C_a$ is conductive and constitutes the electrode $E_a$.

10. A device according to claim 1, wherein the electrode $E_a$ is formed by the association of the layers $C_a$ and $C_b$.

11. A device according to claim 1, wherein the electrolyte is liquid and is contained in a compartment which maintains the electrolyte in contact with the layer $C_b$.

12. A device according to claim 2, wherein the electrolyte is liquid and is contained in a compartment which maintains the electrolyte in contact with the layer $C_b$.

13. A device according to claim 1, wherein the electrolyte E is a solid electrolyte.

14. A device according to claim 1, wherein the electrode $E_b$ is a silver electrode.

15. A device according to claim 13 wherein the solid electrode is selected from the group comprising the silver halides AgCl, AgBr, AgI, the silver sulphur halides $Ag_3SI$, $AG_3SBr$, the mixtures of silver halides and alkali halides $Rb\ Ag_4I_5$, $KAg_4I_5$, aluminum oxide doped by the $Ag^+$ ions having the formula $Ag_{1+x}Al_{11}O_{17}$ said group being such that the conduction by the $Ag^+$ ion is good at room temperature in order to utilize current densities which permit formation of the necessary silver deposit in a sufficiently short period of time with a small potential difference.

16. A device according to claim 1, wherein the layer $C_c$ is made of a metal M which is such that the oxidation-reduction potential of $M/M^{n+}$ is higher than:
   — the reduction potential of the electrode $E_a$, and
   — the reduction potential of the $H^+$ ions in the case of and aqueous electrolyte.

17. A device according to claim 1, wherein the layer $C_a$ has a thickness within the range of 50 to 250A.

18. A device according to claim 1, wherein said device comprises an insulating layer deposited between the electrolyte and the layer $C_b$ in order to define the display zones, said display zones being those zones in which a reflecting layer $C_c$ is deposited.

19. A device according to claim 18, wherein the material constituting the deposited insulating layer is selected from inorganic insulating materials such as silica, alumina, and silicon nitride and the organic insulating materials such as resins and plymers.

20. A device according to claim 1, wherein the electrode $E_b$ is cut so as to constitute the figures displayed by metallic deposition of the layer $C_c$ on those portions of the layer $C_b$ which are located opposite to the figure formed by the electrode $E_b$.

21. A device according to claim 1, wherein the current supplies to at least one of the electrodes $E_a$ and $E_b$ serve to bring different parts of the electrodes $E_a$ or $E_b$ to different potentials, said parts being insulated from each other.

* * * * *